United States Patent
Yang

(10) Patent No.: US 7,761,647 B2
(45) Date of Patent: Jul. 20, 2010

(54) STORAGE DEVICE WITH AUTOMATIC INTERFACE-SWITCHING FUNCTION

(75) Inventor: Chih-Chin Yang, Taipei (TW)

(73) Assignee: Prolific Technology Inc., Nan Kang, Taipei (TW)

( * ) Notice: Subject to any disclaimer, the term of this patent is extended or adjusted under 35 U.S.C. 154(b) by 214 days.

(21) Appl. No.: 11/763,457

(22) Filed: Jun. 15, 2007

(65) Prior Publication Data

US 2008/0189465 A1    Aug. 7, 2008

(30) Foreign Application Priority Data

Feb. 5, 2007    (TW) ............................. 96104147 A

(51) Int. Cl.
*G06F 13/00* (2006.01)
(52) U.S. Cl. .................... 710/316; 710/74; 326/31; 327/334
(58) Field of Classification Search ................ 710/316
See application file for complete search history.

(56) References Cited

U.S. PATENT DOCUMENTS

| | | | | |
|---|---|---|---|---|
| 7,237,719 B2* | 7/2007 | Fruhauf | ...................... | 235/451 |
| 2004/0143693 A1* | 7/2004 | Hwang | ........................ | 710/305 |
| 2005/0197017 A1* | 9/2005 | Chou et al. | ................. | 439/660 |
| 2007/0011472 A1* | 1/2007 | Cheng | ........................ | 713/300 |
| 2007/0162676 A1* | 7/2007 | Hsu et al. | .................... | 710/301 |
| 2007/0197100 A1* | 8/2007 | Tsao | .......................... | 439/638 |

FOREIGN PATENT DOCUMENTS

CN    1416066 A    5/2003

* cited by examiner

*Primary Examiner*—Henry W. H. Tsai
*Assistant Examiner*—Elias Mamo
(74) *Attorney, Agent, or Firm*—Winston Hsu

(57) ABSTRACT

A storage device with automatic-switching function is disclosed. When the storage device is coupled to a USB interface, the power provided by the USB interface turns the USB/SATA converter on to convert data from the USB interface into SATA format and transmit to a hard disk. When the storage device is coupled to a SATA interface instead of the USB interface, the power provided by the USB interface does not turn the USB/SATA converter on to convert data. In this way, the data from the SATA interface directly transmit to the hard disk.

18 Claims, 7 Drawing Sheets

STORAGE DEVICE WITH AUTOMATIC INTERFACE-SWITCHING FUNCTION

BACKGROUND OF THE INVENTION

1. Field of the Invention

The present invention relates to a storage device, and more particularly, to a storage device with automatic interface-switching function.

2. Description of the Prior Art

Please refer to FIG. 1. FIG. 1 is a diagram illustrating a conventional hard disk external box 100. The hard disk external box comprises a Serial Advanced Technology Attachment (SATA) connector 101, a Universal Serial Bus (USB) connector 102, a USB/SATA converting controller 103, a regulator 104, an analog switch 105, and a hard disk 106. The hard disk external box 100 transmits data between the computer 109 through the SATA interface 107 and the USB interface 108. In this way, the data of the computer 109 can be saved in the hard disk 106. The hard disk 106 is a hard disk of SATA interface, which means the hard disk 106 transmits data through SATA interface and receives data through SATA interface.

The SATA connector 101 is coupled to the SATA interface 107 of the computer 109 for transmitting SATA signals to the hard disk 106 through the analog switch 105. The USB connector 102 is connected to the USB interface 108 of the computer 109 for transmitting USB signals to the USB/SATA converting controller 103. The USB/SATA converting controller 103 converts the received USB signals into SATA signals and transmits to the hard disk 106 through the analog switch 105. The regulator 104 is coupled to the USB/SATA converting controller 103 for converting a power supply to the power supply the USB/SATA converting controller 103 needs. The analog switch 105 comprises a control end C, a first end 1, a second end 2, and an output end O. The analog switch 105 couples the first end 1 or the second end 2 to the output end O according to the received command X on the control end C. That is, the analog switch 105 transmits SATA signals from the USB/SATA converting controller 103 or the SATA connector 101 to the hard disk 106 according to the command X.

The command X is manual. For example, when a user need to couple the first end 1 and the output end O of the analog switch 105, he or she has to manually issue the command X to the analog switch 105 to couple the first end 1 and the output end O. However, the hard disk external box 100 only couples one of the SATA interface 107 and the USB interface 108 for exchanging data with the computer 109. Thus, when the hard disk external box 100 couples to the SATA interface 107, the user has to manually switch the analog switch 105 for coupling the second end 2 and the output end O so that the received data by the SATA connector 101 is able to transmit to the hard disk 106. When the hard disk external box 100 couples to the USB interface 108 of the computer 109, the user has to manually switch the first end 1 coupled to the output end O so that the data converted by the USB/SATA converting controller 103 is able to transmit to the hard disk 106. In this way, the user has to manually switch the analog switch 105 every time when the hard disk external box 100 is coupled to the computer 109, which is not convenient.

SUMMARY OF THE INVENTION

The present invention provides a storage device with automatic interface-switching function. The storage device comprises a first interface connector comprising a first pin for transmitting a first voltage; a hard disk for storing data; a second interface connector coupled to the hard disk wherein the second interface is different from the first interface; a first regulator comprising a first end coupled to the first pin of the first interface connector; a second end coupled to a first power; and a third end for outputting a second power when the first end of the first regulator receives the first voltage wherein the first regulator converts the first power into the second power; and a first interface/second interface converting controller comprising a power end coupled to the third end of the first regulator for receiving the second power; a first end coupled to the first interface connector; and a second end coupled to the second interface connector; wherein the second end of the first interface/second interface converting controller is high impedance when the power end of the first interface/second interface converting controller does not receives the second power; wherein the first interface/second interface converting controller converts first interface data into second interface data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
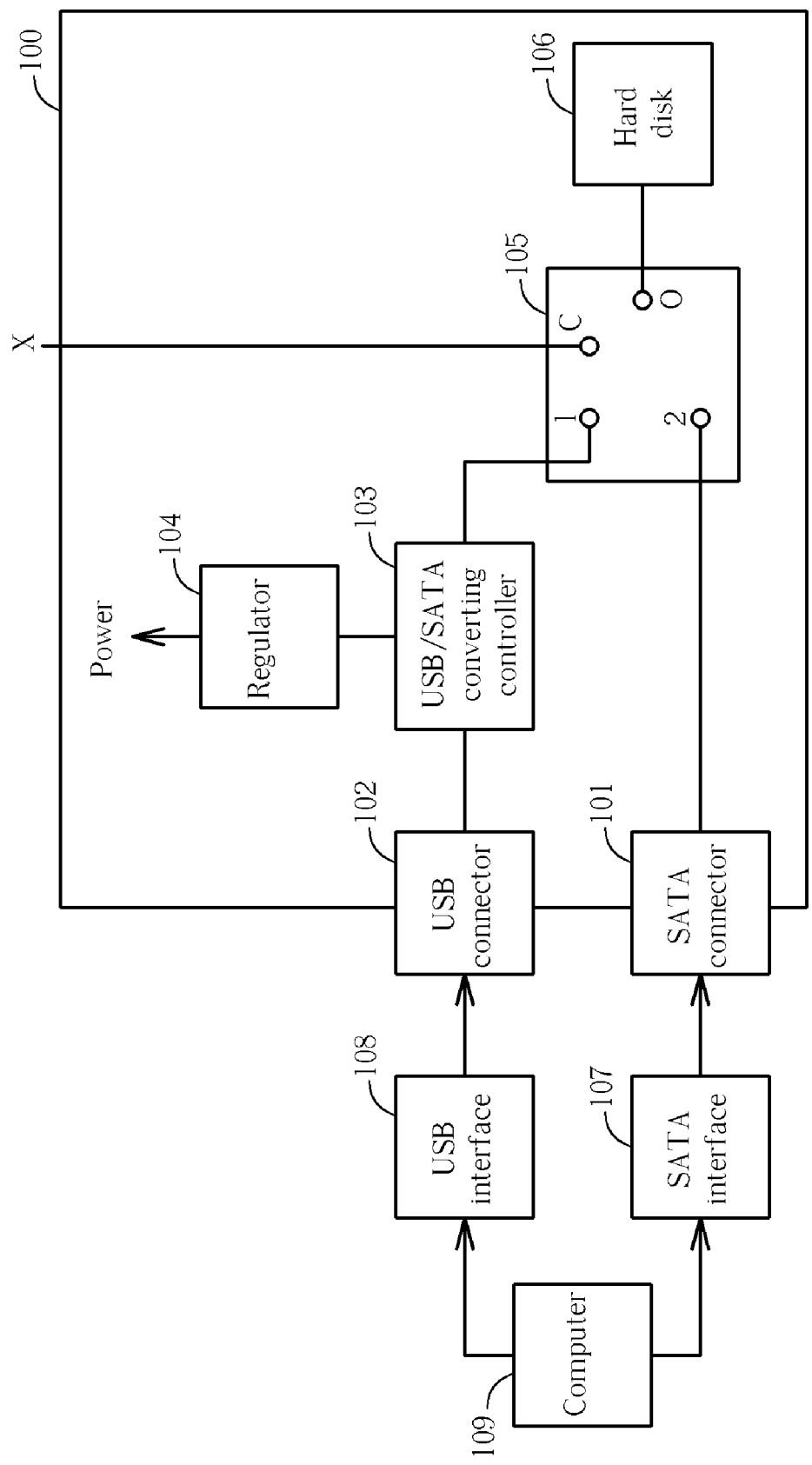
FIG. 1 is a diagram illustrating a conventional hard disk external box.
Figure 2:
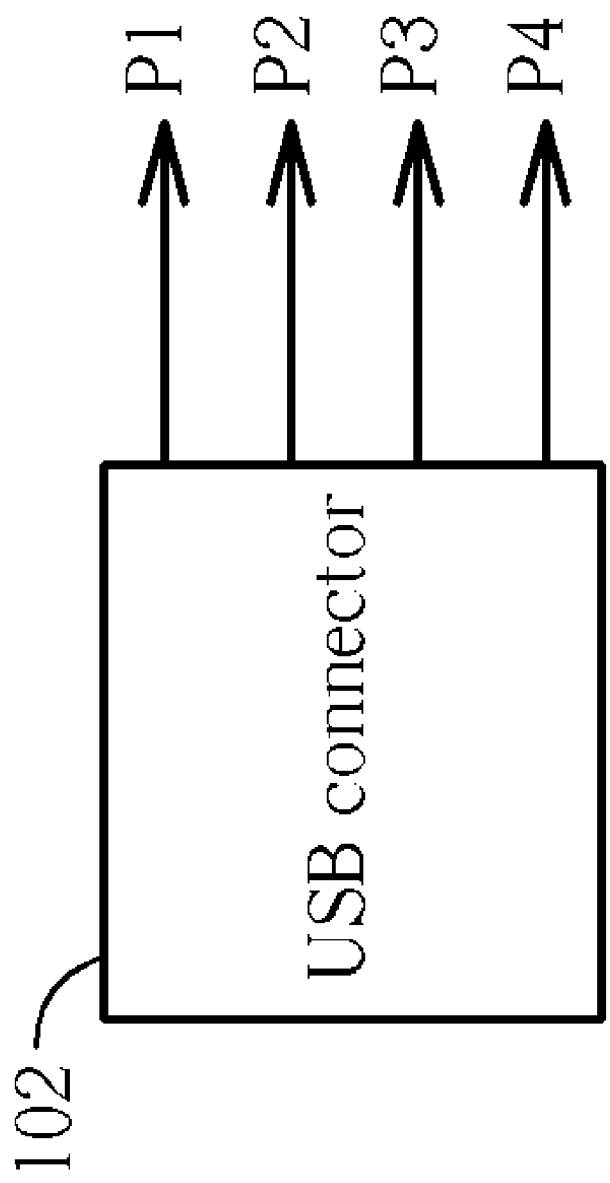
FIG. 2 is a diagram illustrating a USB connector.

Please refer to FIG. 2. FIG. 2 is a diagram illustrating a USB connector 102. As shown in FIG. 2, the USB connector 102 comprises 4 pins P1, P2, P3, and P4 for respectively coupling to the corresponding pin of the USB interface 108 of the computer 109. Each of the pins has its own definition: pin P1 is disposed for receiving power from the computer 109, pins P2 and P3 are disposed for transmitting data, pin P4 is disposed for coupling a common ground end. When the USB connector 102 is coupled to the USB interface 108 of the computer 109, the computer 109 transmits power to the USB connector 102 so that the voltage of the pin P1 is high. On the other hand, when the USB connector 102 is not coupled to the USB interface 108 of the computer 109, the voltage of the pin P1 is low. Therefore, the present invention utilizes the voltage level of the pin P1 to determine if the hard disk external box is coupled to the USB interface 108. For example, if the voltage transmitted from the computer 109 is 5 Volts, when the USB connector 102 is coupled to the USB interface 108, the voltage of the pin P1 is 5 volts, and when the USB connector 102 is not coupled to the USB interface 108, the voltage of the pin P1 is 0 volts. By the method described above, it is correctly determined if the USB connector 102 is coupled to the USB interface 108.

Figure 3:
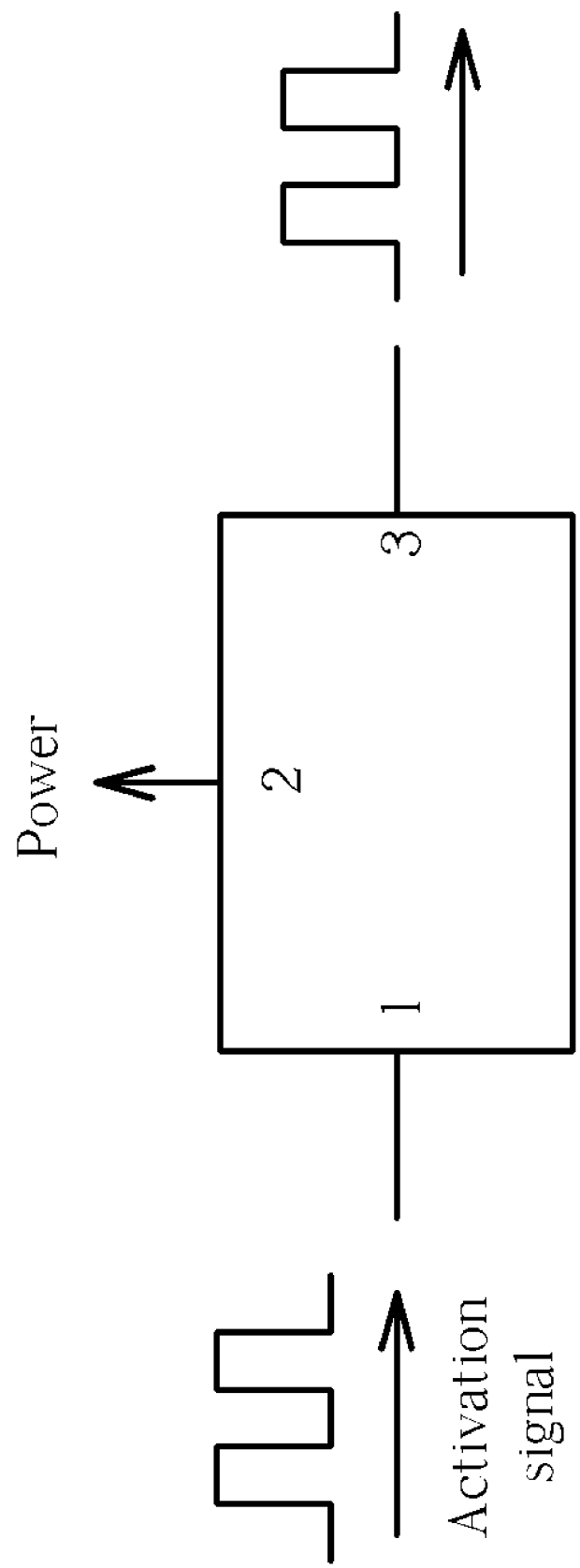
FIG. 3 is a diagram illustrating a regulator.

Please refer to FIG. 3. FIG. 3 is a diagram illustrating a regulator 104. As shown in FIG. 3, the regulator 104 comprises 3 ends 1, 2, and 3. The first end 1 is disposed for receiving an activation signal, the second end 2 is disposed for receiving a first power, and the third end 3 is disposed for outputting a second power. The regulator 104 receives a power through the second end 2, then converts the received power to the power with the demanded voltage, and outputs the power with the demanded voltage on the third end 3 according to the activation signal received. For example, the regulator 104 converts a power with 5 volts to a power with 3.3 volts. When receiving the activation signal, the regulator 104 outputs the power with 3.3 volts. When not receiving the activation signal, the regulator 104 does not output the power with 3.3 volts. Thus, the present invention utilizes controllable output of the regulator 104 to control the activation of the USB/SATA converting controller 103.

Figure 4:
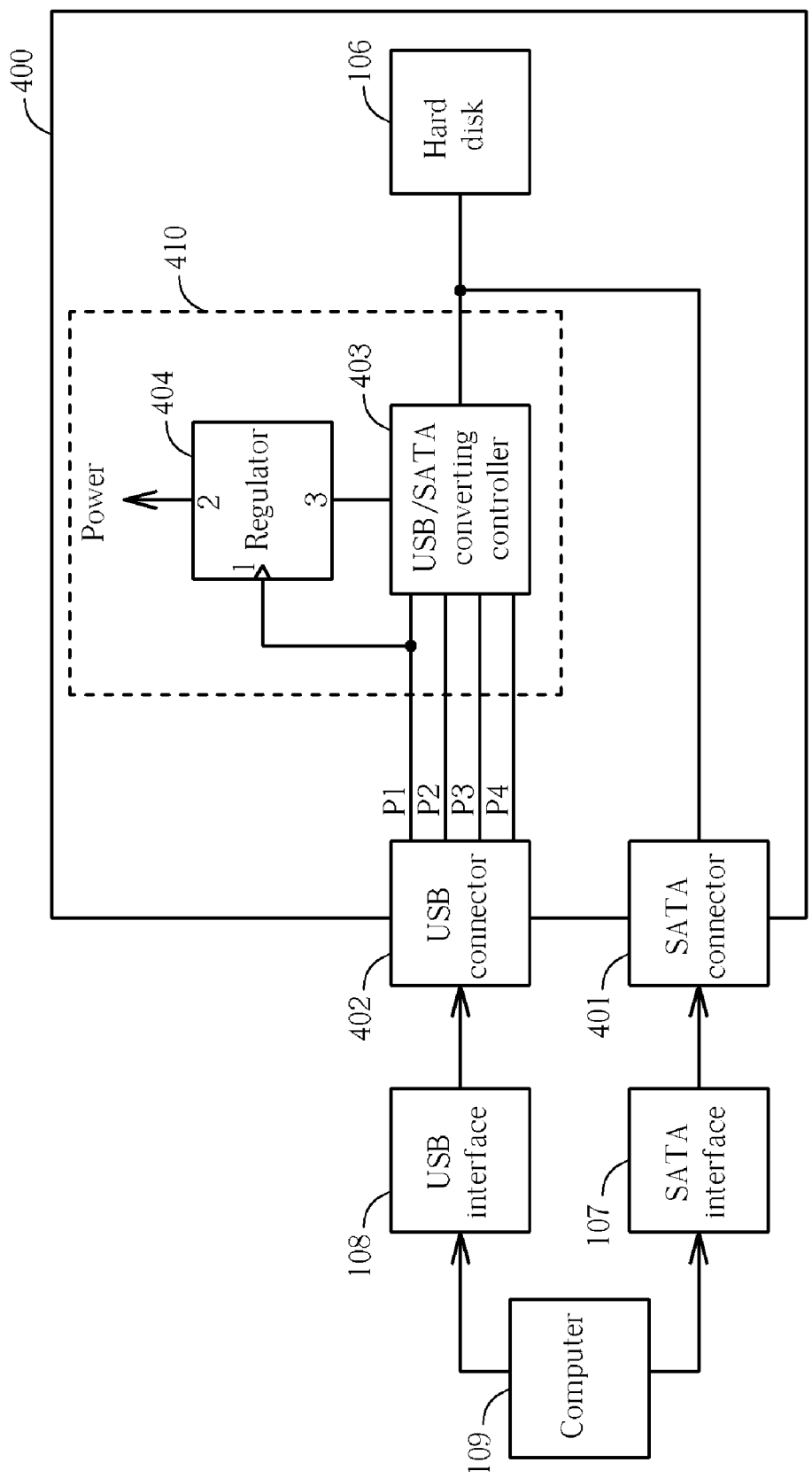
FIG. 4 is a diagram illustrating a storage device with automatic interface-switching function.

Please refer to FIG. 4. FIG. 4 is a diagram illustrating a storage device 400 with automatic interface-switching function. As shown in FIG. 4, the storage device 400 comprises a SATA connector 401, a USB connector 402, a USB/SATA converting module 410, and a hard disk 106. The USB/SATA converting module 410 comprises an USB/SATA converting controller 403 and a regulator 404. The storage device 400 is utilized for coupling to the USB interface 108 or the SATA interface 107 of the computer 109 so that the hard disk 106 correctly exchanges data with the computer 109 through the USB interface 108 or the SATA interface 107 without the user's manually switching. The SATA connector 401 is disposed for coupling the hard disk 106 and the SATA interface 107 of the computer 109 and to transmit the received SATA data directly to the hard disk 106. The USB connector 402 is disposed for coupling the USB interface 108 of the computer 109 and the USB/SATA converting controller 403. The USB/SATA converting controller 403 converts the received USB data to SATA data and then transmits the converted data to the hard disk 106. The regulator 404 comprises 3 ends 1, 2, and 3. The first end 1 is disposed for coupling to the pin P1 of the USB connector 402 and receiving the power transmitted from the computer 109 as an activation signal, the second end 2 is disposed for receiving a first power, and the third end 3 is disposed for coupling the USB/SATA converting controller 403 and outputting a second power to the USB/SATA converting controller 403 so as to enable the functioning of the USB/SATA converting controller 403. The regulator 404 receives a power through the second end 2 and converts the received power to the power with the demanded voltage, and then outputs the power with the demanded voltage through the third end 3 according to the activation signal received on the first end 1.

Generally, the converting controller is designed to work when the power is available, and sets all pins to be high impedance when the power is not available. Therefore, when the power is not available and the converting controller does not work, all devices coupled to the converting controller work regularly because the pins of the converting controller are set to be high impedance, which is equivalent when the all devices do not couple to the converting controller. In this way, when the USB/SATA converting controller 403 does not work when the power is not available, it is equivalent that the converting controller 403 does not exist from the viewpoint of the SATA connector 401 and the hard disk 106.

Please continue referring to FIG. 4. When the storage device 400 is coupled to the USB interface 108 of the computer 109, the computer 109 transmits the power (assumed to be 5 volts) to the pin P1 of the USB connector 402 through the USB interface 108. Thus, the voltage of the pin P1 is 5 volts, which enables the regulator 404 to output the power to the USB/SATA converting controller 403. Consequently, the USB/SATA converting controller 403 works regularly, converts the USB data from the USB connector 402 to the SATA data, and transmits to the hard disk 406. In this way, the transmission between the computer 109 and the hard disk 106 is correctly completed.

Please continue referring to FIG. 4. When the storage device 400 is coupled to the SATA interface 107 instead of the USB interface 108, the pin P1 of the USB connector 402 does not receive any power. Thus, the voltage of the pin P1 is 0 volts. Consequently, the regulator 404 is not activated to output power to the USB/SATA converting controller 403. Meanwhile, the USB/SATA converting controller 403 does not work because the power is not available and the pins of the USB/SATA converting controller 403 are set to be high impedance. In this way, the transmission between the computer 109 and the hard disk 106 can be correctly executed though the SATA interface 107 without the interference of the USB/SATA converting controller 403.

Therefore, the storage device 400 effectively switches the USB and the SATA interfaces. When coupling to the USB interface of the computer, the storage device 400 automatically activates the USB/SATA converting controller so as to convert the USB data into SATA data and transmit to the hard disk. When coupling to the SATA interface of the computer, the storage device 400 automatically turns off the USB/SATA converting controller so as to transmit the SATA data from the computer directly to the hard disk. Compared to the prior art, the present invention not only provides automatic interface-switching function but also saves switch components, which raises convenience.

Figure 5:
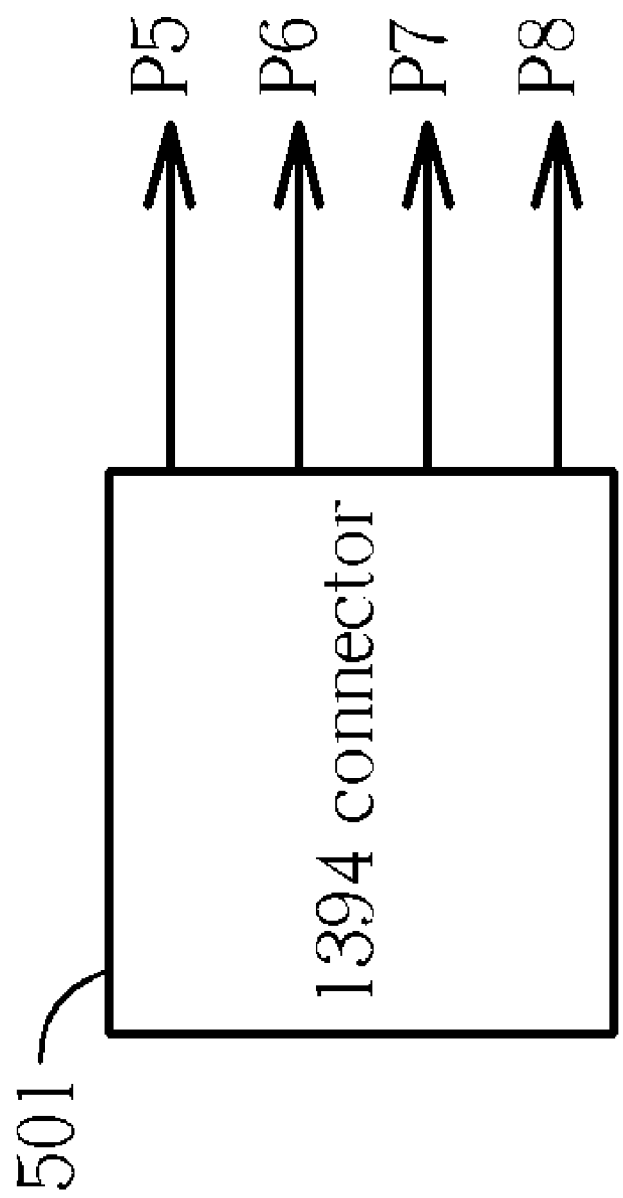
FIG. 5 is a diagram illustrating a 1394 connector.

Please refer to FIG. 5. FIG. 5 is a diagram illustrating a Institute of Electrical and Electronics Engineers (IEEE) 1394 connector 501. As shown in FIG. 5, the 1394 connector 501 comprises 4 pins P5, P6, P7, and P8 for respectively coupling to the corresponding pin of the 1394 interface of the computer. The pin P5 is disposed for receiving the power transmitted from the computer. The pins P6 and P7 are disposed for transmitting data (in fact, the pin P6 is a pair of pins for differentially transmitting data, the pin P7 is also a pair of pin for differentially transmitting data, and for brevity, it is only shown as two pins P6 and P7.) The pin P8 is disposed for coupling a common ground end.

Figure 6:
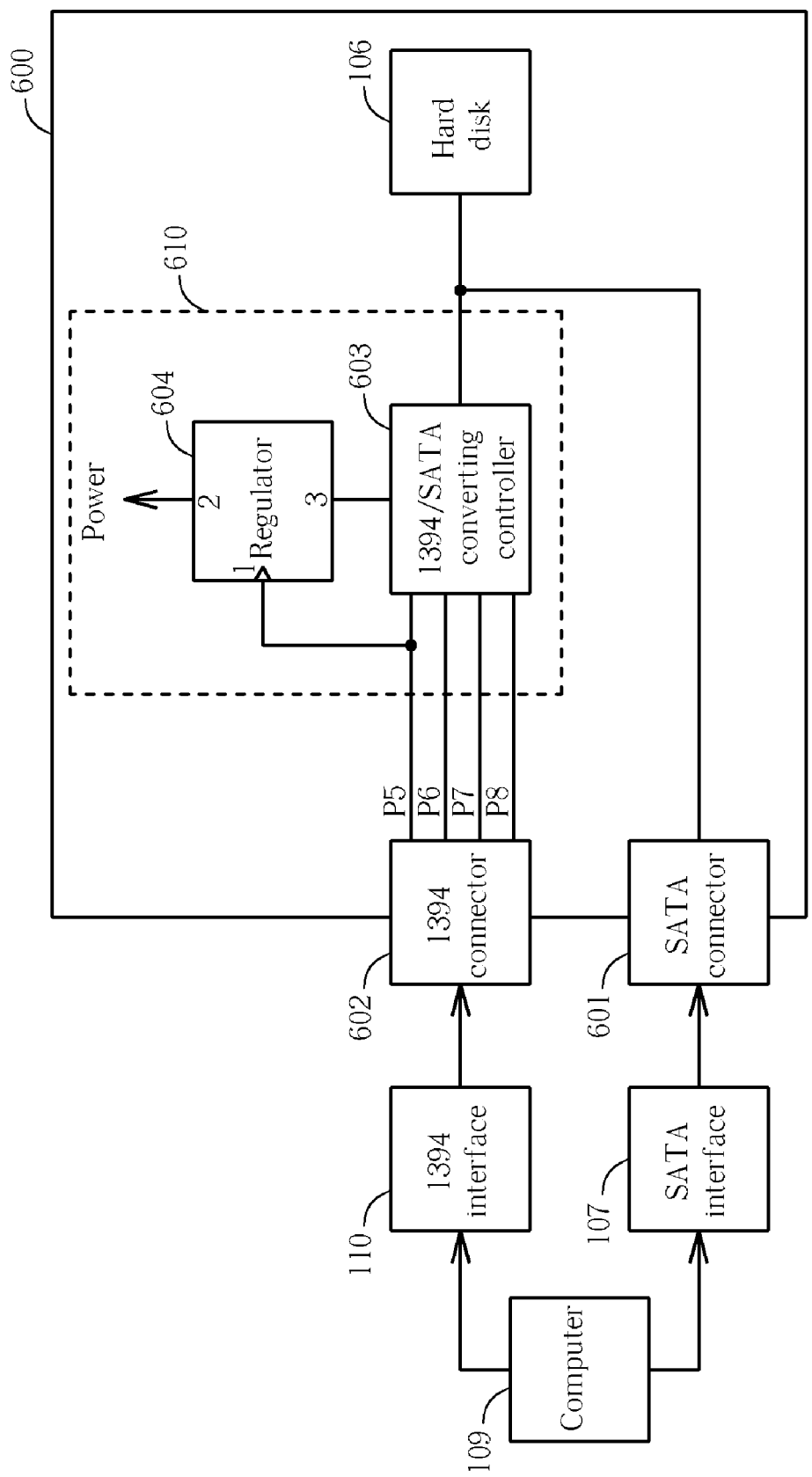
FIG. 6 is a diagram illustrating the storage device with automatic interface-switching function of the present invention.

Therefore, based on the spirit of the present invention, the 1394 interface is also applicable to the storage device with automatic interface-switching function. Please refer to FIG. 6. FIG. 6 is a diagram illustrating the storage device 600 with automatic interface-switching function of the present invention. As shown in FIG. 6, the storage device 600 comprises a SATA connector 601, a 1394 connector 602, a 1394/SATA converting module 610, and a hard disk 106. The 1394/SATA converting module 610 comprises a 1394/SATA converting controller 603 and a regulator 604. The storage device 600 is utilized for coupling to a 1394 interface 110 or a SATA interface 107 of a computer 109 so that the hard disk 106 exchanges data with the computer 109 correctly through the 1394 interface 110 or the SATA interface 107 without the user's manually switching. The SATA connector 601 is disposed for coupling the hard disk 106 and the SATA interface 107 of the computer 109 and transmitting the received SATA data directly to the hard disk 106. The 1394 connector 602 is disposed for coupling the 1394 interface 110 of the computer 109 and the 1394/SATA converting controller 603 and transmitting the 1394 data from the computer 109 to the 1394/SATA converting controller 603. The 1394/SATA converting controller 603 converts the received 1394 data into the SATA data and then transmits to the hard disk 106. The regulator 604 comprises 3 ends 1, 2, and 3. The first end 1 is disposed for coupling the pin P5 of the 1394 connector 602 and receiving the power transmitted from the computer 109 as an activation signal. The second end 2 is disposed for receiving a first power. The third end 3 is coupled to the 1394/SATA converting controller 603 and disposed for outputting a second power to the 1394/SATA converting controller 603 so as to enable the 1394/SATA converting controller 603 work regularly. The regulator 604 receives a power through the second end 2, converts the received power to the power with the demanded voltage, and outputs the power with the demanded voltage according to the activation signal received on the first end 1.

Please continue referring to FIG. 6. When the storage device 600 is coupled to the 1394 interface 110 of the computer 109, the computer 109 transmits the power to the pin P5 of the 1394 connector 602 through the 1394 interface 110. Thus, the voltage of the pin P5 is 5 volts, which enables the regulator 604 to output the converted power to the 1394/SATA converting controller 603. Consequently the 1394/SATA converting controller 603 works regularly, converts the 1394 data from the 1394 connector 602 into SATA data, and transmits to the hard disk 106. In this way, the transmission between the computer 109 and the hard disk 106 is correctly completed.

Please continue referring to FIG. 6. When the storage device 600 is coupled to the SATA interface 107 of the computer 109, the voltage of the pin P5 of the 1394 connector 602 is 0 volts since the 1394 interface 110 of the computer 109 does not couple to the storage device 600. Consequently, the regulator 604 is not enabled to output power to the 1394/SATA converting controller 603, and the 1394/SATA converting controller 603 does not work and sets all pins to be high impedance. In this way, the transmission between the computer 109 and the hard disk 106 is correctly completed without interference of the 1394/SATA converting controller 603.

Therefore, the storage device 600 effectively switches the 1394 and the SATA interfaces. When coupling to the 1394 interface of the computer, the storage device 600 automatically activates the 1394/SATA converting controller so as to convert the 1394 data into SATA data and transmit to the hard disk. When coupling to the SATA interface of the computer, the storage device 600 automatically turns off the 1394/SATA converting controller so as to transmit the SATA data from the computer directly to the hard disk.

Figure 7:
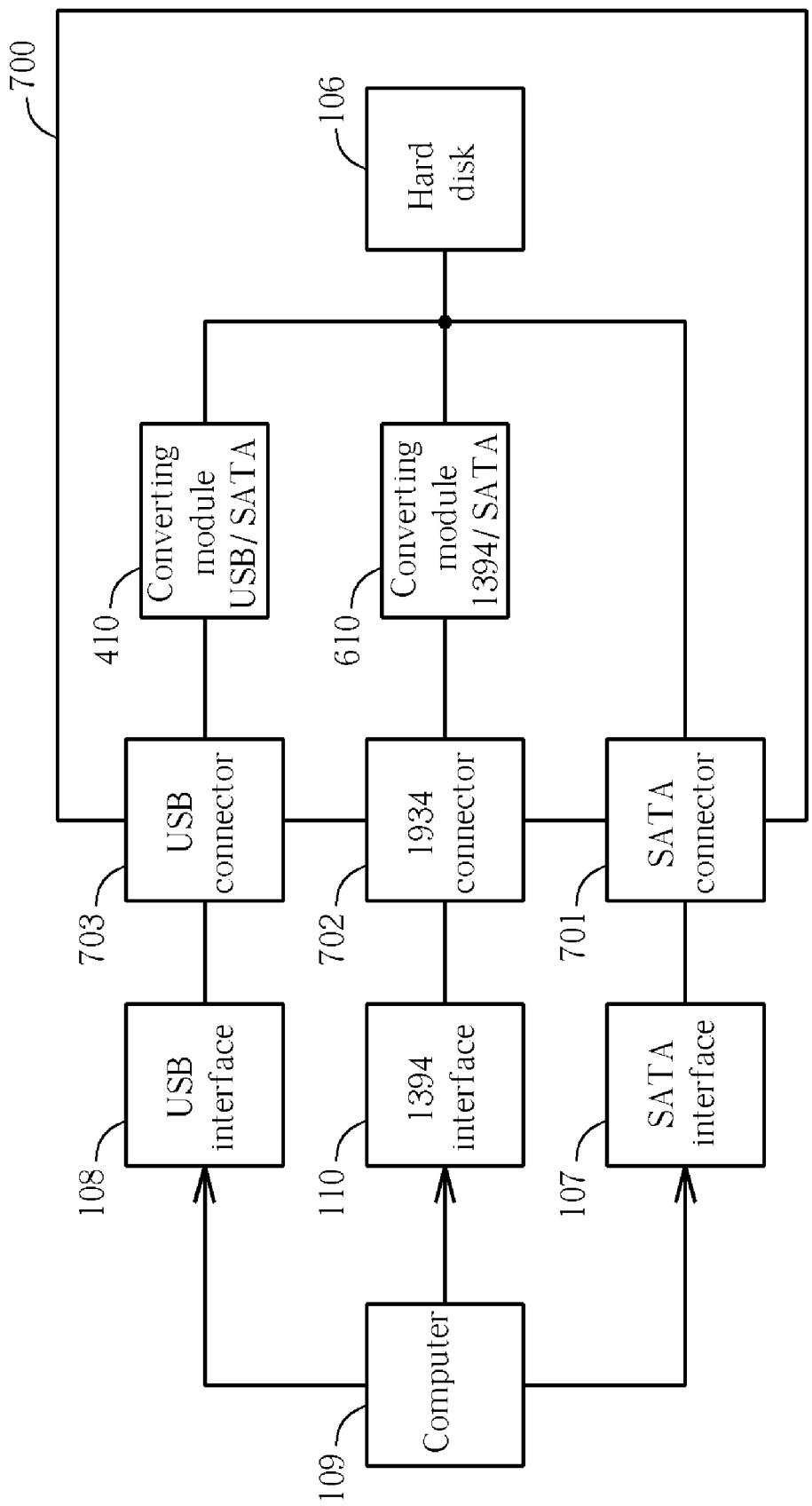
FIG. 7 is a diagram illustrating a storage device with automatic interface-switching function of the present invention.

Additionally, the 1394, USB, and SATA interfaces can be designed into the storage device with automatic interface-switching function of the present invention. Please refer to FIG. 7. FIG. 7 is a diagram illustrating a storage device 700 with automatic interface-switching function of the present invention. As shown in FIG. 7, the storage device 700 comprises a SATA connector 701, a 1394 connector 702, an USB connector 703, a 1394/SATA converting module 610, an USB/SATA converting module 410. The storage device 700 is disposed for coupling an USB interface 108 of a computer 109, a 1394 interface 110, or a SATA interface 107 to the hard disk 106 and enabling the correct data transmission between the computer 109 and the hard disk 106. The SATA connector 701 is coupled to the hard disk 106 for coupling to the SATA interface 107 of the computer 109 and transmitting received SATA data directly to the hard disk 106. The 1394 connector 702 is coupled to the converting module 610 and disposed for coupling the 1394 interface 110 of the computer 109 to the 1394/SATA converting module 610. The USB connector 703 is coupled to the converting module 410 and disposed for coupling the USB interface 107 of the computer 109 to the USB/SATA converting module 410. The related descriptions about the operation are the same as those of the storage devices 400 and 600. Thus, when the storage device 700 is coupled to the USB interface 108 of the computer 109, the USB/SATA converting controller 706 is enabled to convert the USB data into SATA data and transmit to the hard disk 708. When the storage device 700 is coupled to the 1394 interface 110 of the computer 109, the 1394/SATA converting controller 704 is enabled to convert the 1394 data into SATA data and transmit to the hard disk 708. When the storage device 700 is coupled to the SATA interface 107 of the computer 109, neither of the 1394/SATA converting controller 704 and the USB/SATA converting controller 706 are enabled and the SATA data from the computer 109 is directly transmitted to the hard disk 708. Thus, the storage device 700 automatically switches the 1394 interface, the USB interface, and the SATA interface, which provides great convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage device with automatic interface-switching function comprising:
   a first interface connector comprising a first pin for transmitting a first voltage;
   a hard disk for storing data;
   a second interface connector coupled to the hard disk wherein the second interface is different from the first interface;
   a first regulator comprising:
     a first end coupled to the first pin of the first interface connector;
     a second end coupled to a first power; and
     a third end for outputting a second power when the first end of the first regulator receives the first voltage wherein the first regulator converts the first power into the second power; and
   a first interface/second interface converting controller comprising:
     a power end coupled to the third end of the first regulator for receiving the second power;
     a first end coupled to the first interface connector; and
     a second end coupled to the second interface connector;
   wherein the second end of the first interface/second interface converting controller is high impedance when the power end of the first interface/second interface converting controller does not receive the second power;
   wherein the first interface/second interface converting controller converts first interface data into second interface data.

2. The storage device of claim 1 wherein the first interface connector is a Universal Serial Bus (USB) connector, and the first interface is a USB interface.

3. The storage device of claim 2 wherein the first interface connector further comprises:
   a first data pin coupled to the first interface/second interface converting controller for transmitting data;
   a second data pin coupled to the first interface/second interface converting controller for transmitting data; and
   a ground pin coupled to the first interface/second interface converting controller.

4. The storage device of claim 2 further comprising:
   a third interface connector comprising a first pin for transmitting a second voltage;
   a second regulator comprising:
     a first end coupled to the first pin of the third interface connector;
     a second end coupled to the first power; and a third end for outputting a third power when the first end of the second regulator receives the second voltage;

wherein the second regulator converts the first power into the third power; and a third interface/second interface converting controller comprising:

a power end coupled to the third end of the second regulator for receiving the third power;

a first end coupled to the third interface connector; and a second end coupled to the second interface connector;

wherein the second end of the third interface/second interface converting controller is high impedance when the power end of the third interface/second interface converting controller does not receive the third power;

wherein the third interface/second interface converting controller converts third interface data to second interface data.

5. The storage device of claim 4 wherein the third interface connector is a 1394 connector and the third interface is a 1394 interface.

6. The storage device of claim 5 wherein the third interface connector further comprises:

a first pair of data pins coupled to the third interface/second interface converting controller for transmitting data;

a second pair of data pins coupled to the third interface/second interface converting controller for transmitting data; and a ground pin coupled to the third interface/second interface converting controller.

7. The storage device of claim 1 wherein the second interface connector is a Serial Advanced Technology Attachment (SATA) connector, and the second interface is a SATA interface.

8. The storage device of claim 1 wherein the first interface connector is an Institute of Electrical and Electronics Engineers (IEEE) 1394 connector, and the first interface is an IEEE 1394 interface.

9. The storage device of claim 8 wherein the first interface connector further comprises:

a first pair of data pins coupled to the first interface/second interface converting controller for transmitting data;

a second pair of data pins coupled to the first interface/second interface converting controller for transmitting data; and a ground pin coupled to the first interface/second interface converting controller.

10. A storage device with automatic interface-switching function comprising:

a first interface connector comprising a first pin for transmitting a first voltage;

a second interface connector comprising a first pin for transmitting a second voltage;

a first regulator comprising:

a first end coupled to the first pin of the first interface connector;

a second end coupled to a first power; and a third end for outputting a second power when the first end of the first regulator receives the first voltage;

wherein the first regulator converts the first power into the second power;

a second regulator comprising:

a first end coupled to the first pin of the second interface connector;

a second end coupled to the first power; and a third end for outputting a third power when the first end of the second regulator receives the second voltage;

wherein the second regulator converts the first power into the third power;

a first interface/third interface converting controller comprising:

a power end coupled to the third end of the first regulator for receiving the second power;

a first end coupled to the first interface connector; and a second end coupled to a hard disk;

wherein the second end of the first interface/third interface converting controller is high impedance when the power end of the first interface/third interface converting controller does not receives the second power;

wherein the first interface/third interface converting controller converts first interface data into third interface data; and a second interface/third interface converting controller comprising:

a power end coupled to the third end of the second regulator for receiving the third power;

a first end coupled to the second interface connector; and a second end coupled to the hard disk;

wherein the second end of the second interface/third interface converting controller is high impedance when the power end of the second interface/third interface converting controller does not receive the third power;

wherein the second interface/third interface converting controller converts second interface data into third interface data.

11. The storage device of claim 10 wherein the first interface connector is a USB connector, and the first interface is a USB interface.

12. The storage device of claim 10 wherein the second interface connector is an IEEE 1394 connector, and the second interface is an IEEE 1394 interface.

13. The storage device of claim 10 wherein the third interface is a SATA interface.

14. The storage device of claim 11 wherein the first interface connector further comprises:

a first data pin coupled to the first interface/second interface converting controller for transmitting data;

a second data pin coupled to the first interface/second interface converting controller for transmitting data; and a ground pin coupled to the first interface/second interface converting controller.

15. The storage device of claim 12 wherein the second interface connector further comprises:

a first pair of data pins coupled to the second interface/third interface converting controller for transmitting data;

a second pair of data pins coupled to the second interface/third interface converting controller for transmitting data; and a ground pin coupled to the second interface/third interface converting controller.

16. The storage device of claim 10 further comprising a third interface connector coupled to the hard disk.

17. The storage device of claim 2, wherein the second interface connector is a SATA connector, and the second interface is a SATA interface.

18. The storage device of claim 8, wherein the second interface connector is a SATA connector, and the second interface is a SATA interface.

* * * * *